United States Patent Office 3,833,734
Patented Sept. 3, 1974

3,833,734
P-PHENYLENEDIAMINES AS HYPOLIPIDEMICS
Robert E. Manning, Mountain Lakes, N.J., assignor to Sandoz-Wander, Inc., Hanover, N.J.
No Drawing. Continuation-in-part of application Ser. No. 111,106, Jan. 29, 1971, which is a continuation-in-part of application Ser. No. 69,429, Sept. 3, 1970, which in turn is a continuation-in-part of application Ser. No. 9,972, Feb. 9, 1970, all now abandoned. This application Jan. 15, 1973, Ser. No. 323,628
Int. Cl. A61k 27/00
U.S. Cl. 424—330            9 Claims

ABSTRACT OF THE DISCLOSURE

Certain p-phenylenediamines, e.g., $N^1,N^2$-di-(2-octyl)-p-phenylenediamine, are useful as hypolipidemics.

---

This application is a continuation-in-part of copending application Ser. No. 111,106, filed Jan. 29, 1971, now abandoned, which in turn is a continuation-in-part of application Ser. No. 69,429, filed Sept. 3, 1970, now abandoned, which in turn was continuation-in-part of application Ser. No. 9,972, filed Feb. 9, 1970, now abandoned.

This invention relates to the pharmaceutical activity of p-phenylenediamine derivatives. More particularly, this invention concerns the use of $N^1,N^2$-alkyl substituted-p-phenylenediamines and acid addition salts thereof in the treatment of lipidemia in mammals. The invention also relates to pharmaceutical compositions containing the above compounds as an active ingredient thereof.

The active agents with which this invention is concerned may be represented by the following structural formula:

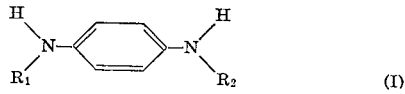

(I)

where $R_1$ and $R_2$ independently represent straight or branched chain alkyl having 8 to 10 carbon atoms, e.g., octyl, nonyl and the like; and pharmaceutically acceptable acid addition salts thereof.

Representative of the compounds of formula (I), which are useful in this invention are $N^1,N^2$-di-n-octyl-p-phenylenediamine; $N^1,N^2$-di-(2-octyl)-p-phenylenediamine; $N^1$,$N^2$-di-(2-decyl)-p-phenylenediamine. Especially preferred compounds of formula (I) are compounds of the formula:

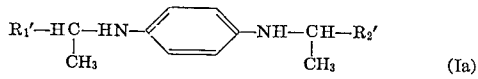

(Ia)

where $R_1'$ and $R_2'$ independently represent a straight chain alkyl radical containing from 6 to 8 carbon atoms.

Many of the compounds of formula (I) above are known and may be prepared according to methods disclosed in the literature. The compounds of formula (I) not specifically disclosed in the literature may be prepared by analogous methods from known starting materials. The present invention contemplates only the novel use of such compounds in pharmaceutical applications, particularly as hypolipidemic agents.

As previously indicated, the compounds of formula (I) are useful because they possess pharmacological activity in mammals, particularly as hypolipidemic agents as indicated by their activity in male albino Wistar rats weighing 110-130 g. initially. The rats are maintained on drug-free laboratory chow diet for seven days and then divided into groups of 8 to 10 animals. Each group with the exception of the control is then given orally 30 milligrams per kilogram of body weight per diem of the compound for six days. At the end of this period, the animals are anesthetized with sodium hexobarbital and bled from the carotid arteries. Serum or plasma samples are then extracted with isopropanol, and the cholesterol content of the extracts is estimated on a Technicon Autoanalyzer by standard methodology. The mean total serum cholesterol levels are then computed and the hypolipidemic activity is expressed as the fall in cholesterol levels as a percentage of the control level. For the triglyceride determination, blood samples are collected as above and 1.0 ml. samples of the serum are added to 9.0 ml. redistilled isopropanol. The autoanalyzer cupsful of a mixture of zeolite-copper hydroxide and Lloydds reagent (Kessler, G., and Lederer, H., 1965, Technicon Symposium, Mediad Inc., New York, 345–347) are added, and the mixture is shaken for one hour. After centrifugation, 2 ml. of the clear supernates are evaporated to dryness and saponified by addition of 0.1 ml. 10% KOH in 90% ethanol and 1.0 ml. Skelly B (petroleum ether bp 60°–70°). After acidification and the removal of fatty acids with petroleum ether, the aqueous phases are neutralized, suitably diluted with water, and analyzed for glycerol by the method of Lofland (Anal. Biochem. 9, 393, 1964) using the Technicon Autoanalyzer. The change in serum triglyceride levels induced by the drug is computed as a percentage of the control triglyceride levels.

For such usage, the compounds are administered orally as such or admixed with conventional pharmaceutical carriers. They may be administered in such forms as tablets, dispersible powders, granules, capsules, syrups and elixirs. The compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mono-oleate) and preservatives (ethyl-p-hydroxybenzoate). Capsules may contain the active ingredient alone or admixed with an inert solid diluent, e.g., calcium carbonate, calcium phosphate and kaolin. These pharmaceutical preparations may contain up to about 90% of the active ingredient in combination with the carrier or adjuvant.

Furthermore these compounds of formula (I) may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzenesulfonate, maleate, malate, tartrate, methanesulfonate, cyclohexylsulfamate and the like.

The hypolipidemic effective amount of active ingredient employed for the treatment of lipidemia may vary depending on the particular compound employed and the severity of the condition being treated. However, in general, satisfactory results are obtained when the compounds of formula (I) are administered at a daily dosage of from about 10 milligrams to about 500 milligrams per kilogram of animal body weight, preferably given in divided doses two to four times a day, or in sustained release form. For most large mammals in need of said treatment, the total daily dosage is from about 50 to about 1000 milligrams. Dosage forms suitable for internal use comprise from about 12.5 to about 500 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets containing from about 25 to 250 milligrams of the active ingredient.

EXAMPLE 1

Dry filled capsules.—Capsules suitable for oral administration which contain the following ingredients are prepared in a conventional manner. Such capsules are useful in treating lipidemia at a dose of one capsule 2 to 4 times a day.

| Ingredients: | Weight (mg.) |
|---|---|
| $N^1,N^2$-di-(2-decyl) - p - phenylenediamine·dihydrochloride | 100 |
| Inert solid diluent (starch, lactose, kaolin) | 200 |

EXAMPLE 2

Tablets.—Tablets suitable for oral administration which contain the following ingredients may be prepared by conventional tabletting techniques. Such tablets are useful in treating lipidemia at a dose of one tablet 2 to 4 times a day.

| Ingredients: | Weight (mg.) |
|---|---|
| $N^1,N^2$-di-(2-octyl) - p - phenylenediamine·di-dihydrochloride | 50 |
| Tragacanth | 10 |
| Lactose | 197.5 |
| Corn starch | 25 |
| Talcum | 15 |
| Magnesium stearate | 2.5 |

EXAMPLE 3

Sterile suspension for injection.—The following pharmaceutical composition is formulated with the indicated amount of active agent using conventional techniques. The injectable suspension is indicated for use in the treatment of lipidemia and represents a unit dose which may be administered once or twice a day.

| Ingredients: | Weight (mg.), sterile injectable suspension |
|---|---|
| $N^1,N^2$-di-(2-decyl)-p-phenylenediamine | 50 |
| Sodium carboxymethyl cellulose U.S.P. | 1.25 |
| Methyl cellulose | 0.4 |
| Polyvinylpyrrolidone | 5 |
| Lecithin | 3 |
| Benzyl alcohol | 0.01 |
| Buffer agent to adjust pH for desired stability, q.s. | |
| Water, q.s. to 1 ml. | |

EXAMPLE 4

Oral liquid suspension.—The following oral liquid suspension is formulated with the indicated amount of active agent using conventional techniques. The oral liquid suspension is indicated for use in the treatment of lipidemia and represents a unit dose which may be administered 2 to 4 times a day.

| Ingredients: | Weight (mg.), oral liquid suspension |
|---|---|
| $N^1,N^2$-di-(2-decyl)-p-phenylenediamine | 50 |
| Sodium carboxymethyl cellulose U.S.P. | 12.5 |
| Magnesium aluminum silicate | 47.5 |
| Flavoring agent, q.s. | |
| Coloring agent, q.s. | |
| Methyl paraben, U.S.P. | 4.5 |
| Propyl paraben, U.S.P. | 1.0 |
| Polysorbate 80 (e.g. Tween 80), U.S.P. | 5 |
| Sorbitol solution, 70%, U.S.P. | 2,500 |
| Buffer agent to adjust pH for desired stability, q.s. | |
| Water, q.s. to 5,000 mg. | |

What is claimed is:

1. A pharmaceutical composition in unit dosage form for treating lipidemia in mammals comprising as an active ingredient thereof a compound of the formula:

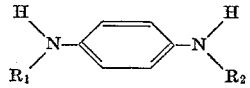

where $R_1$ and $R_2$ independently represent straight or branched chain alkyl having 8 to 10 carbon atoms, or a non-toxic pharmaceutically acceptable acid addition salt thereof, and a pharmaceutically acceptable carrier therefor, said compound being present in said composition in an amount of about 12.5 to about 500 milligrams.

2. The pharmaceutical composition of claim 1 in which the active ingredient is a compound of the formula:

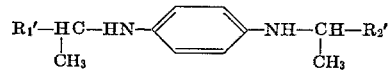

where $R_1'$ and $R_2'$ independently represent a straight chain alkyl radical containing from 6 to 8 carbon atoms.

3. The composition of claim 1 wherein the carrier is a solid orally ingestible carrier and the active ingredient is present in said composition to the extent of from about 25 to 250 mg. per unit dosage.

4. The composition of claim 2 wherein the carrier is a solid orally ingestible carrier and the active ingredient is present in said composition to the extent of from about 25 to 250 mg. per unit dosage.

5. A tablet for treating lipidemia in mammals comprising as an active ingredient thereof a compound of the formula:

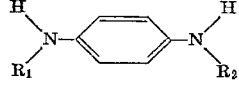

where $R_1$ and $R_2$ are as defined in claim 1, or a non-toxic pharmaceutically acceptable acid addition salt thereof, said compound being present in said tablet to the extent of from about 25 to 250 mg. per unit dosage.

6. The method for treating lipidemia, which comprises orally administering to a mammal in need of said treatment a hypolipidemically effective amount of a compound of the formula:

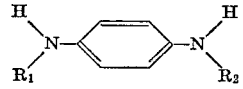

where $R_1$ and $R_2$ are as defined in claim 1, or a non-toxic pharmaceutically acceptable acid addition salt thereof.

7. The method for treating lipidemia, which comprises orally administering to a mammal in need of said treatment a hypolipidemically effective amount of a compound of the formula:

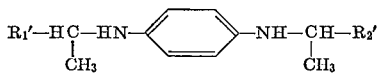

where $R_1'$ and $R_2'$ are as set out in claim 2, or a nontoxic pharmaceutically acceptable acid addition salt thereof.

8. The method of claim 6 wherein the compound is administered in a unit dosage form comprising said compound to the extent of from about 12.5 mg. to about 500 mg. per unit dosage.

9. The method of claim 7 wherein the compound is administered in a unit dosage form comprising said compound to the extent of from about 12.5 mg. to about 500 mg. per unit dosage.

References Cited

UNITED STATES PATENTS

| 2,965,605 | 12/1960 | Reynolds | 260—45.9 |
| 3,427,281 | 2/1969 | Young et al. | 260—45.9 |

FOREIGN PATENTS

| 163,222 | 4/1953 | Australia | 260—577 |

OTHER REFERENCES

*Chemical Abstracts*, vol. *52*, 20624 (1958).
*Chemical Abstracts*, vol. *53*, 8332 (1959).
*Chemical Abstracts*, vol. *60*, 9807 (1964).
*Chemical Abstracts*, vol. *66*, 9664, 103441m (1967).

ALBERT T. MEYERS, Primary Examiner

F. E. WADDELL, Assistant Examiner